(12) United States Patent
Zhou et al.

(10) Patent No.: US 10,026,996 B2
(45) Date of Patent: Jul. 17, 2018

(54) MOLTEN ALKALI METAL-ALUMINUM SECONDARY BATTERY

(71) Applicant: DYNANTIS CORP, Santa Barbara, CA (US)

(72) Inventors: Mi Zhou, Goleta, CA (US); Anthony F. Sammells, Santa Barbara, CA (US)

(73) Assignee: Dynantis Corp, Santa Barbara, CA (US)

( * ) Notice: Subject to any disclaimer, the term of this patent is extended or adjusted under 35 U.S.C. 154(b) by 0 days.

(21) Appl. No.: 15/096,047

(22) Filed: Apr. 11, 2016

(65) Prior Publication Data
US 2017/0294685 A1 Oct. 12, 2017

(51) Int. Cl.
| H01M 10/39 | (2006.01) |
| H01M 4/80 | (2006.01) |
| H01M 4/38 | (2006.01) |
| H01M 10/44 | (2006.01) |
| H01M 4/02 | (2006.01) |

(52) U.S. Cl.
CPC ............. *H01M 10/39* (2013.01); *H01M 4/38* (2013.01); *H01M 4/381* (2013.01); *H01M 4/80* (2013.01); *H01M 10/44* (2013.01); *H01M 2004/021* (2013.01)

(58) Field of Classification Search
CPC ................................................... H01M 10/39
See application file for complete search history.

(56) References Cited

U.S. PATENT DOCUMENTS

| 4,945,012 A | 7/1990 | Bugga et al. |
| 4,992,345 A | 2/1991 | Meintjes et al. |
| 5,158,839 A | 10/1992 | Wright |
| 5,763,117 A * | 6/1998 | Wright ............. H01M 10/3936 429/104 |

(Continued)

FOREIGN PATENT DOCUMENTS

WO    WO 2015103432    7/2015

OTHER PUBLICATIONS

Aguilar N. P. et al. (Oct. 2015) "Pechini Synthesis of $Na_3V_2(PO_4)_2F_3$/C Doped with Aluminum As Cathodefor Lithium Ion Batteries," ECS Meeting Abstracts, Abstract Ma2015-02 297 PRiMe Meeting Oct. 2-7, 2015, Honolulu, Hawaii.

(Continued)

*Primary Examiner* — Jonathan Crepeau
(74) *Attorney, Agent, or Firm* — Leydig, Voit & Mayer, Ltd.

(57) ABSTRACT

An aluminum-based cathode (positive electrode) for storage cells formed by deposition of a layer of aluminum metal on a porous conductive substrate. Storage cells and batteries having the cathode. The porous conducting substrate can be metal, conductive carbon or a refractory material, such as a metal boride or metal carbide. The aluminum-deposited porous substrate is in electrical contact with a cathode current collector and a suitable liquid catholyte. The cathode is, for example, combined with a molten alkali metal anode to form a storage cell. The alkali metal and the catholyte are molten or liquid at operating temperatures of the cell. Methods of storing energy and generating energy using cell having the aluminum-based cathode are provided.

19 Claims, 3 Drawing Sheets

(56) References Cited

U.S. PATENT DOCUMENTS

| | | | |
|---|---|---|---|
| 2003/0094379 A1 | 5/2003 | Jacobson et al. | |
| 2013/0130124 A1* | 5/2013 | Fukunaga | H01M 4/661 429/242 |
| 2015/0249261 A1 | 9/2015 | Dai et al. | |
| 2016/0308253 A1* | 10/2016 | Robins | H01M 4/381 |
| 2017/0098848 A1 | 4/2017 | Sammells | |

OTHER PUBLICATIONS

Gifford P.R. et al. (1988) "An Aluminum/Chlorine Rechargeable Cell Employing a Room Temperature Molten Salt Electrolyte," J. Electrochemical Soc. 135:650-654.

Hudak, N.S. (Feb. 2014) "Chloroaluminate-Doped Conducting Polymers as Positive Electrodes in Rechargeable Aluminum Batteries," J. Phy. Chem. C 118, 5203-5215.

Jayaprakash, N. et al. (2011) "The rechargeable aluminum-ion battery," Chem Comm 47:12610-12612.

Liao, Q. et al. (1997) "Electrodeposition of Aluminum from the Aluminum Chloride-i-Methyl-3-ethyl im idazol iu m Chloride Room Temperature Molten Salt + Benzene," J. Electrochemical Soc. 144:936-943.

Lin M-C. et al. (Apr. 2015) "An ultrafast rechargeable aluminium-ion battery," Nature 520:325-329 with extended data (total 16 pages).

Rani, J. V. et al. (Aug. 2013) "Fluorinated Natural Graphite Cathode for Rechargeable Ionic Liquid Based Aluminum-Ion Battery," J. Electrochemical Soc. 160:A1781-A1784.

Vaughan, J. et al. (2008) "Electrodeposition of Aluminum from Aluminum Chloride-Trihexyl(tetradecyl) Phosphonium Chloride," J. Electrochemical Soc. 155:D68-D72.

Yue G. et al. (2009) "A Promising Method for Electrodeposition of Aluminium on Stainless Steel in Ionic Liquid," AIChE J. 5593):783-796 published by American Institute of Chemical Engineers.

Lu X. et al., "Advanced materials for sodium-beta alumina batteries: Status, challenges and perspectives," Journal of Power Sources 195:2431-2442, 2010.

* cited by examiner

FIG. 3 ducive substrate is porous electrically conductive ceramic. In specific embodiments, the porous conductive substrate is porous electrically conductive carbon. In specific embodiments, the porous metal substrate is porous nickel. In specific embodiments, the liquid catholyte is an alkali metal haloaluminate. In specific embodiments, the liquid catholyte is a sodium haloaluminate. In specific embodiments, the liquid catholyte is a sodium chloroaluminate. In specific embodiments, the liquid catholyte is $NaAlCl_4$. In other embodiments, the liquid electrolyte is an ionic liquid. In specific embodiments, the ionic liquid comprises aluminum ions. In specific embodiments, the ionic liquid comprises aluminum ions and sodium ions. In specific embodiments, the liquid catholyte comprises an ionic liquid and $AlCl_4$. In specific embodiments, the liquid catholyte comprises an ionic liquid and $AlCl_4$ or NaCl. In specific embodiments, the liquid electrolyte comprises an ionic liquid and $AlCl_4$ and NaCl.

In specific embodiments, the liquid alkali metal is sodium. In specific embodiments, the solid electrolyte conducts sodium ions. In specific embodiments, the solid electrolyte is beta alumina and in more preferred embodiments, the solid electrolyte is beta" alumina (beta double prime alumina).

In specific embodiments, a cell of this invention includes a solid electrolyte (e.g., beta alumina or beta"alumina) element (for example in the form of a sheet, layer or tube) having a thickness ranging from 0.5 to 3 mm, or more preferably having a thickness of 0.5 to 1.5 mm. In specific embodiments, a cell of this invention includes a porous nickel substrate upon which aluminum is deposited. The porous substrate can be in the form of a layer, sheet or element of thickness ranging from 1 to 4 mm or more preferably from 1.5 to 3 mm. In a specific embodiment, the metal substrate is in the form of a metal foam. In a specific embodiment, the metal substrate is nickel foam.

In specific embodiments, aluminum is deposited on the porous nickel by any known electroplating method or is deposited in situ on the conductive substrate during operation of the cell.

In specific embodiments, the storage cells and batteries are operated at temperatures at which the alkali metal is liquid (or molten), the catholyte is liquid (or molten) and the solid electrolyte conducts alkali metal ions. In embodiments, employing ionic liquids the cells and batteries are operated at temperatures, where the alkali metal is molten, the ionic liquid is liquid and is stable to decomposition and where the solid electrolyte is conducts alkali meta ions. In a specific embodiment, the cells and batteries are operated at a temperature between about 150 to 300° C. dependent upon the alkali metal, the catholyte and the solid electrolyte employed. More specifically, the cell is operated at a temperature between 225 to 275° C., when beta" alumina is employed and the alkali metal is sodium. More specifically, the cell can be operated at temperatures of between 150 to 195° C. employing solid electrolytes that function at these lower temperatures (e.g., NaSICON) and catholytes which are ionic liquids and liquid at these lower temperatures.

The invention provides a battery comprising one or more storage cells of this invention. In such a battery the storage cells may be electrically connected in series, in parallel or both, as is known in the art.

The invention also provides a method for producing a storage cell comprising:

forming an anode (negative electrode) comprising alkali metal

MOLTEN ALKALI METAL-ALUMINUM SECONDARY BATTERY

BACKGROUND OF THE INVENTION

There is a significant need in the art for improved secondary (rechargeable) batteries having high energy density, decreased cost, improved safety, reduced thermal management and improved stability of component supply. Batteries having such improved characteristics will be useful in a variety of applications and are of particular interest for electric utility grid storage.

Electric utilities are seeking more cost effective and efficient strategies to manage energy delivery to the grid. Peak demand is frequently met by the use of relatively expensive gas turbines, which at times of low demand remain idle. Ideally, base load electrical energy production could be operated at optimum peak efficiency, with demand variations being either absorbed or delivered using some form of energy storage. Pumped hydro (PH) technology, where water is reversibly pumped from a lower to higher elevation, has been employed for such energy storage, where round-trip efficiency is typically 68%. However, acceptable sites for implementation of PH energy storage, based upon location and environmental concerns, are now very limited. An alternatively is the use of large storage batteries, where round-trip energy conversion efficiencies can exceed that of PH, and wherein siting is not limited by geography. The market for storage batteries for this application is expected to grow, provided that battery costs are reduced and performance is increased. Major issues that are currently limiting implementation of advanced battery systems for grid storage include: overall cost for materials and associated hardware, long-term availability of materials, safety, achieving long cycle life and thermal management during operation. The present invention provides an improved alkali metal battery with an aluminum based cathode to meet these requirements. The batteries of the invention provide an extremely low cost solution for electrochemical storage of bulk energy.

SUMMARY OF THE INVENTION

This disclosure provides an aluminum-based cathode (positive electrode) formed by deposition of a layer of aluminum metal on a porous conductive substrate, in particular on a porous metal substrate. The aluminum-deposited porous substrate is in electrical contact with a cathode current collector and a suitable liquid catholyte. In a specific embodiment, this cathode is combined with a molten alkali metal anode to form a storage cell. In an embodiment, the molten alkali metal is in contact with an anode (negative electrode) current collector and with a solid electrolyte which conducts the alkali metal ion of the molten alkali metal. In an embodiment, a storage cell is formed having an anode (negative electrode) compartment formed in contact with the solid electrolyte and the aluminum-based cathode (positive electrode) compartment with a suitable liquid catholyte (which is a liquid electrolyte) between the solid electrolyte and the aluminum coated conductive substrate. The alkali metal and the catholyte are molten or liquid at operating temperatures of the cell.

The disclosure provides storage cells comprising the aluminum-based cathode and batteries comprising one or more of such cells. Storage cells and batteries herein can be recharged.

In specific embodiments, the porous conductive substrate is porous metal. In specific embodiments, the porous conforming a cathode (positive electrode) comprising a porous conductive substrate coated with aluminum;

positioning a dense, alkali metal ion-conductive solid electrolyte between the anode and the cathode, positioning a liquid catholyte between the cathode and the solid electrolyte in contact with the porous conductive substrate, wherein the porous conductive substrate is permeated with the liquid catholyte.

In an embodiment, the cell is constructed in the discharged state.

The disclosure further provides a method for generating energy, comprising discharging one or more charged storage cells of the invention. The invention further provides a method for generating energy which comprises forming one or more cell of this disclosure and discharging the one or more cell. In specific embodiments, the cells of the invention are rechargeable and the methods for generating energy further comprise a step of storing electrical energy which comprises recharging the one or more cells after discharge.

The invention further provides a battery for use in electric utility grid storage which comprises one or more cell of this invention.

Other aspects of the invention will be apparent on review of the drawings and detailed description which follows.

DETAILED DESCRIPTION OF THE INVENTION

The present disclosure is based at least in part on the use of an aluminum-based cathode in a storage cell configuration. More specifically the cathode is a porous metal substrate upon which aluminum metal is deposited. More specifically, it was found that a suitable aluminum-containing cathode could be prepared by in situ electrodeposition of aluminum metal onto a metal substrate from an aluminum-containing liquid electrolyte during operation of a cell having a molten sodium anode.

Thus, an aluminum-based cathode useful in particular in combination with a liquid alkali metal anode is provided. The cathode comprises a porous conductive substrate coated with aluminum metal. In a specific embodiment, the porous conductive substrate is a porous metal. In specific embodiments, the porous metal is stainless steel, iron, copper, or nickel. The porous metal can be a nickel-coated metal. In a specific embodiment, the porous conductive substrate is porous nickel or an alloy of nickel. More specifically, the metal is porous nickel foam. In another embodiment, the porous conductive substrate is an electrically conductive refractory material such as a metal boride, carbide, nitride, silicide or mixture thereof, particularly where the metal is one or more of the transition elements. Specifically useful are metal borides, carbides, nitrides, and/or silicides of Cr, Mn, Fe, Co, Ni, Ti, Zr, Hf, V, Nb, Ta and W, and mixtures thereof. In an embodiment, aluminum deposited on the porous cathode ranges from 0.05 to 0.4 Ah/cm$^2$. This latter number would correspond to 0.13 g/cm$^2$ or a volume of 0.05 cm$^3$. Al has an equivalent weight of 9 (a three electron reduction reaction) and a density of 2.7 g/cm$^2$.

The cell and batteries of the invention employ a liquid (molten) alkali metal anode. In general the electrode can comprise any alkali metal or mixture thereof. It will be appreciated that the choice of alkali metal in the negative electrode must be consistent with the choice of electrolyte such that alkali metal ions are transported to the cathode. The liquid alkali metal negative electrode is preferably a liquid sodium electrode. Various liquid alkali metal electrodes are known in the art. U.S. Pat. No. 8,343,661 provides additional description of liquid alkali metal electrodes useful in the cells of this invention, including additives which can affect electrode performance. This patent is incorporated by reference herein for this description.

The liquid electrolyte provides electrical and ionic conductivity between the solid electrolyte and the aluminum-based cathode. The liquid electrolyte is a liquid at the operating temperatures of the storage cell. In specific embodiments, the liquid electrolyte conducts sodium cations. In specific embodiments, the liquid electrolyte comprises aluminum cations. In specific embodiments, the liquid electrolyte comprises sodium cations.

In specific embodiments, the liquid electrolyte is an alkali metal haloaluminate. The alkali metal of the electrolyte comprises the alkali metal of the anode. The preferred alkali metal of the electrolyte and of the negative electrode is sodium. The alkali metal haloaluminate is preferably an alkali metal chloroaluminate and more preferably is a sodium chloroaluminate. In embodiments, the electrolyte is an alkali metal chloro tetraaluminate, and particularly is NaAlCl$_4$. In embodiments, the molar ratio of alkali metal to aluminum in the electrolyte ranges from 0.8 to 1.2. In embodiments, the molar ratio of alkali metal to aluminum in the electrolyte ranges from 0.9 to 1.1. In embodiments, the molar ratio of alkali metal to aluminum in the electrolyte ranges from 0.95 to 1.05. In an embodiment, the molar ratio of alkali metal to aluminum is about 1.

In another specific embodiment, the liquid electrolyte comprises an ionic liquid and aluminum cations. In an embodiment, the liquid electrolyte comprises an ionic liquid and AlCl$_3$. In an embodiment, the ionic liquid is one in which 5 wt % or more of AlCl$_3$ is soluble. In an embodiment, the ionic liquid is one in which 10 wt % or more of AlCl$_3$ is soluble. In an embodiment, the liquid electrolyte comprises alkali metal cations. In an embodiment, the liquid electrolyte comprises sodium cations. In an embodiment, the liquid electrolyte comprises sodium cations, aluminum cations and an ionic liquid.

An ionic liquid is a salt in the liquid (molten) state. Ionic liquids can be categorized by their melting point, for example, those that are liquid at room temperature, those that are liquid above 50° C., those that are liquid at a temperature of 100° C., etc. For use in the present invention, ionic liquids are useful as catholytes in the storage cell herein and as such ionic liquids which are liquids over the operating temperatures of the cells can be employed. In addition, ionic liquids useful in the invention must also be stable to decomposition over the operating temperatures of the cells herein. Thus, the decomposition onset temperature of useful ionic liquids must be at least about 50° C. or more above the cell operating temperature and preferably is 100° C. or more higher than the cell operating temperature. Cell operating temperatures largely depend upon the temperature range over which the solid electrolyte employed conducts alkali metal ions. Materials, such as beta" alumina, function for sodium ion conduction at about 200° C. For example, for use with a storage cell operating at 270° C., the ionic liquid should have a decomposition onset temperature of 363° C. or higher. Ionic liquids for use with beta" alumina must be liquid and stable to decomposition at this high temperature. Other solid alkali metal conducting materials, such as NaSICON, function, particularly for sodium ion conduction at lower temperatures. Ionic liquids which are liquid and stable over the temperature range where NaSICON functions for sodium ion conduction are useful in combination with NaSICON. Thus, use of an ionic liquid as a catholyte in the cells herein depends upon the solid electrolyte chosen.

For use as catholytes herein, the ionic liquids must conduct alkali metal ions and aluminum ions.

Ionic liquids are composed of at least on cation and one anion. Ionic liquids useful in catholytes herein include those having quaternary ammonium cations, quaternary phosphonium cations, 1, 3-dialkylimidazolium cations, N-alkylpyridinium cations, and 1,1-dialkylpyrrolidinium cations. Anions of ionic liquids include halide ions (e.g., Cl$^-$), PF$_6^-$, BF$_4^-$, Tf$_2$N$^-$ (triflimide anion), among others. In specific embodiments, useful ionic liquids are those which are halide salts of quaternary ammonium cations, quaternary phosphonium cations, 1, 3-dialkylimidazolium cations, N-alkylpyridinium cations, and 1,1-dialkylpyrrolidinium cations. In specific embodiments, useful ionic liquids are those which are chloride salts of quaternary ammonium cations, quaternary phosphonium cations, 1, 3-dialkylimidazolium cations, N-alkylpyridinium cations, and 1,1-dialkylpyrrolidinium cations. In specific embodiments, useful ionic liquids are those which are PF$_6^-$ salts of quaternary ammonium cations, quaternary phosphonium cations, 1, 3-dialkylimidazolium cations, N-alkylpyridinium cations, and 1,1-dialkylpyrrolidinium cations. In specific embodiments, useful ionic liquids are those which are BF$_4^-$, salts of quaternary ammonium cations, quaternary phosphonium cations, 1, 3-dialkylimidazolium cations, N-alkylpyridinium cations, and 1,1-dialkylpyrrolidinium cations. In specific embodiments, useful ionic liquids are those which are Tf$_2$N$^-$ salts of quaternary ammonium cations, quaternary phosphonium cations, 1, 3-dialkylimidazolium cations, N-alkylpyridinium cations, and 1,1-dialkylpyrrolidinium cations.

For quaternary ammonium and phosphonium cations, the nitrogen and phosphorous respectively are substituted with four alkyl or aryl groups. In specific embodiments, at least one substituent on the nitrogen or phosphorous is an alkyl group having 10 to 20 carbon atoms or more specifically 12 to 18 carbon atoms or one substituent is an aryl group, such as a phenyl group. Alkyl groups for 1, 3-dialkylimidazolium cations, N-alkylpyridinium cations, and 1,1-dialkylpyrrolidinium cations include those having 1-6 carbon atoms including all isomers thereof. For those cations having two alkyl groups, The two alkyl groups are preferably different from one another.

More specifically useful ionic liquids include among others tri(hexyl)tetradecylphosphonium chloride, phenyltrimethylammonium chloride, 1-butyl-3-methylimidazolium chloride, 1-methyl-3-ethylimidazolium chloride, n-butylpyridinium chloride, or 1-butyl-1-methylpyrrolidinium chloride.

Ionic liquids containing Al$^{+3}$ are particularly useful herein. Ionic liquids containing a salt of Al$^{+3}$ are particularly useful herein. Ionic liquids containing AlCl$_3$ are particularly useful herein. Ionic liquids containing Al$^{+3}$ are described, for example, in Giridhar P, El Abedin S Zein, Endres F. Electrodeposition of aluminium from 1-butyl-1-methylpyrrolidinium chloride/AlCl3 and mixtures with 1-ethyl-3-methylimidazolium chloride/AlCl3 [J]. Electrochim. Acta, 2012, 70, 210-214; Yang C C. Electrodeposition of aluminum in molten AlCl3-n-butylpyridinium chloride electrolyte. Mater Chem Phys. 1994; 37:355-361; Liao Q, Pitner W R, Stewart G, Hussey C L, Stafford G R. Electrodeposition of aluminum from the aluminum chloride-1-methyl-3-ethylimidazolium chloride room temperature molten salt 1 benzene. J Electrochem Soc. 1997; 144:936-943; Yue G, Zhang S, Zhu Y, et al. A promising method for electrodeposition of aluminum on stainless steel in ionic liquid [J]. AlChE J., 2009, 55, 783-796; Liu Q, Liu K, Han Q, et al. Study on electrodeposition of Al from trimethylphenylammonium chloride (TMPAC)-aluminum chloride (AlCl$_3$) ionic liquids+benzene. Chin. Surf. Eng., 2010, 23, 34-39; and Vaughan J, Dreisinger D. Electrodeposition of aluminum from aluminum chloride-trihexyl(tetradecyl) phosphonium chloride. J. Electrochem. Soc., 2008, 155(1), D68-72.

The term "dense" as used herein is synonymous with the term "non-porous" and refers to a component, element or layer that exhibits no through porosity. Dense components, elements or layers of this invention exhibit ion conductivity or both ion and electron conductivity. In such dense components, transport across the membrane occurs through the lattice structure and channels in the material rather than through pores. Dense ion-conductive components, elements or layers can function as separators allowing selective passage or transport of a selected ionic species (e.g., a particular alkali metal cation, e.g., sodium cation or a particular anion, e.g., oxygen anion), but not allowing direct transport of neutral species or other ions. It will be appreciated that some low level of direct transport of neutral species and/or other ions may be accommodated in the dense components, elements or layers herein without loss of function. It will be appreciated in the art, that the ion and electronic conductivity of materials used in the invention can vary with material composition, temperature, and thickness through which ions and electrons are transported.

The solid electrolyte between the anode and cathode compartments of the storage cells herein are dense and conduct alkali metal cations, particularly sodium cations. In specific embodiments, sodium cation-conductive beta" alumina is useful as a sodium cation-conductive material. The crystalline structure of sodium cation-conductive beta" alumina, which possesses the general composition NaAl$_5$O$_8$, is a rhombohedral spinel with an R3m space group with lattice constants of 'a'=5.614 and 'c'=33.85 A respectively.

Various alkali metal conductive (including sodium-conductive) materials are known in the art.

Additional examples of alkali metal-conductive materials include, among others: a material having the formula $A_{1+x}Zr_2Si_xP_{3-x}O_{12}$ where $0.1 \leq x \leq 3$, where A is Na, K, or Li; a material having the formula $Na_{1+x}Zr_2Si_xP_{3-x}O_{12}$ where $0.1 \leq x \leq 3$; a material having the formula $A_5BSi_4O_{12}$ where A is Na, K, or Li, and B is Y, Nd, Dy, or Sm, or mixtures thereof; a non-stoichiometric alkali-deficient material having the formula $(A_5BSi_4O_{12})_{1-\delta} (B_2O_3.2SiO_2)_\delta$, where A is Na, K, or Li, and B is Nd, Dy, or Sm, or mixtures thereof and where δ is the measure of deviation from stoichiometry; a material with the formula $Li_{1+x}Al_xTi_{2-x}(PO_4)_3$ or $Li_{1.3}Al_{0.3}Ti_{1.7}(PO_4)_3$. Alternatively, the alkali metal conducting material can be a layered alkali ion conducting ceramic-polymer composite membrane, having alkali ion-selective polymers layered on alkali ion conducting ceramic solid electrolyte materials. Alternatively, the alkali metal-conducting material is a NaSICON, KS ICON or LiSICON membrane available from Ceramatec, Inc (Salt Lake City, Utah). NaSICON materials include those of formula $Na_{1+x}Zr_2P_{3-x}O_{12}$ where $0<x<3$. See: Anantharamulu et al. (2011) J. Mat. Science 46(9) 2821-2837 for a review of NaSICON type materials. Other types of alkali-ion conductive substantially non-porous separators may also be used in the invention. High conductivity NaSICON solid electrolytes are known in the art, for example, see WO2014052439.

The cell and batteries of the invention employ a liquid alkali metal negative electrode. In general the electrode can comprise any alkali metal or mixture thereof. It will be appreciated that the choice of alkali metal in the negative electrode must be consistent with the choice of electrolyte such that alkali metal ions are transported to the positive electrode. The liquid alkali metal negative electrode is preferably a liquid sodium electrode. Various liquid alkali metal electrodes are known in the art. U.S. Pat. No. 8,343,661 provides additional description of liquid alkali metal electrodes useful in the cells of this invention, including additives which can affect electrode performance. This patent is incorporated by reference herein for this description.

Figure 1:
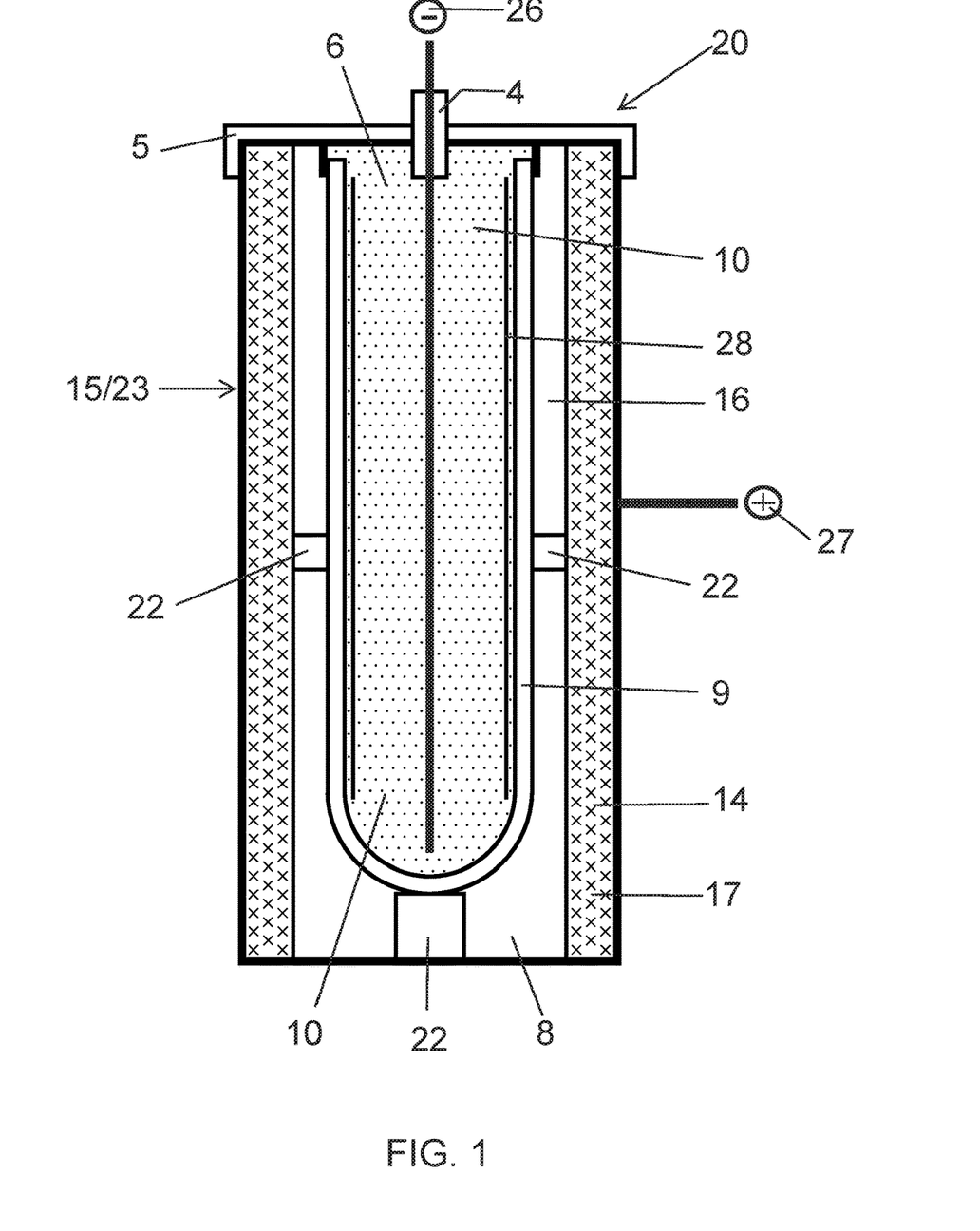
FIG. 1 is a schematic illustration of an exemplary cell comprising an exemplary aluminum-based cathode.

A schematic illustration of an exemplary energy storage cell 20 of this disclosure is provided in FIG. 1. The cell comprises an anode compartment (6) with liquid alkali metal (10), a cathode compartment (8) with an aluminum-coated porous conductive substrate (14), a dense alkali metal-conductive electrolyte (9) separating the anode and cathode compartments formed within housing (15) and an appropriate liquid electrolyte (catholyte) (16) between the solid electrolyte and the cathode.

The cell (20) of FIG. 1 is specifically illustrated with a tubular cell geometry, where a tube formed of dense alkali metal-conductive electrolyte also serves to retain liquid alkali metal (e.g., liquid sodium). In this configuration, the solid electrolyte tube containing the anode is positioned in the cathode compartment spaced apart from and insulated from the porous conductive cathode (14) and the cathode current collector (24, housing 15). This can be accomplished using a plurality of insulating spacers, such as boron nitride spacers (22). The porous conductive cathode (14) is a porous conductive substrate (17) permeated with liquid catholyte (16). Porous substrate (17) is coated with aluminum. The anode and cathode compartments are separately sealed. In the illustrated embodiment, a single cap (5) is employed to separately seal the two compartments. A feed through (4) is provided into the anode compartment for the anode current collector to exit the anode compartment. Negative (23) and positive (24) current collectors are provided. In the illustrated embodiment, the cathode current collection (23) is provided by the conductive housing (15). Appropriate negative (26) and positive (27) leads for electrical connection of the anode and cathode are provided.

In the illustrated tubular embodiment, the anode compartment is provided with an optional alkali metal wick (28) positioned close to the inside tube walls to facilitate uniform distribution of the alkali metal in the tube.

The porous conductive substrate can, for example, be conductive porous ceramic (e.g., electrically conductive mixed metal oxide); a metal mesh, foam or the like (e.g., nickel foam), or a conducting carbon material. The porous conductive substrate may be first coated with a metal other than aluminum, such as nickel or an alloy of nickel. When a porous metal substrate is used, the metal in general can be any metal, such as a transition metal, and particularly the metal can be nickel or an alloy of nickel.

The porous conductive substrate (17) can be coated with aluminum by any known method and more particularly by any known aluminum electrodeposition method prior to cell assembly or aluminum can be deposited in situ from an aluminum-containing catholyte on appropriate operation of the cell. The porous conductive substrate is permeated with liquid electrolyte when the cell is assembled for operation.

It will be apparent to one of ordinary skill in the art that cell of the disclosure can be implemented in a variety of geometries other than the tubular cell illustrated in FIG. 1.

Cell fabrication is preferably performed under inert atmosphere (e.g., Ar).

In a specific embodiment, a cell of the invention is prepared in the discharged state. In the discharged state, a porous conductive substrate having aluminum deposited there upon is placed in the cathode compartment, liquid catholyte is added, which need not contain an aluminum salt. An alkali metal salt, such as NaCl, is also added to the catholyte in an amount sufficient to form molten alkali metal in the anode compartment when the cell is charged. The catholyte can be $NaAlCl_4$ or an alternative liquid catholyte to which the alkali metal salt is added can be used. The cell is initially charged to form molten alkali metal, preferably molten sodium in the anode. Thereafter, the cell can be charged and discharged as desired.

In a specific embodiment, the amount of Al deposited on the cathode is substantially removed after the cell is charged. This can be periodically accomplished by potentiometrically holding the cell potential fixed at the end of charge, so that excess Al is electrochemically removed and introduction into the catholyte as $Al^{3+}$. Removal of substantially all deposited Al after charging can minimize or avoid unsymmetric deposition of Al on discharge.

In a specific embodiment, a cell of the invention is prepared in the charged state. In the charged state, there is no aluminum initially deposited on the conductive cathode. Sodium (or other alkali metal) is introduced into the anode (e.g., the solid electrolyte tube illustrated in FIG. 1). The amount of alkali metal added is such that the capacity of the liquid alkali metal electrode is preferably about 20% greater than that of the cathode, such that the cell is cathode limited. The liquid catholyte containing an aluminum compound, such as $AlCl_3$, is added to the cathode compartment in contact with the conductive cathode. Preferably, the liquid catholyte permeates the porous conductive cathode. A preferred porous conductive cathode is a metal foam and more preferably nickel foam. The cell is heated to operating temperature which depends upon the solid electrolyte, alkali metal and catholyte used. The catholyte and the alkali metal must be liquid at operating temperature, and the solid electrolyte must conduct alkali metal ions at operating temperature. As the cell initially discharges, aluminum is coated on the porous cathode substrate. Thereafter, the cell can be charged and discharged as desired.

Preferably, the effective reservoir of catholyte between the cathode and solid electrolyte should be sufficient to directly react with liquid alkali metal in the anode in the case of cell rupture to avoid reaction of liquid alkali metal with electroactive materials in the cathode.

Figure 2:
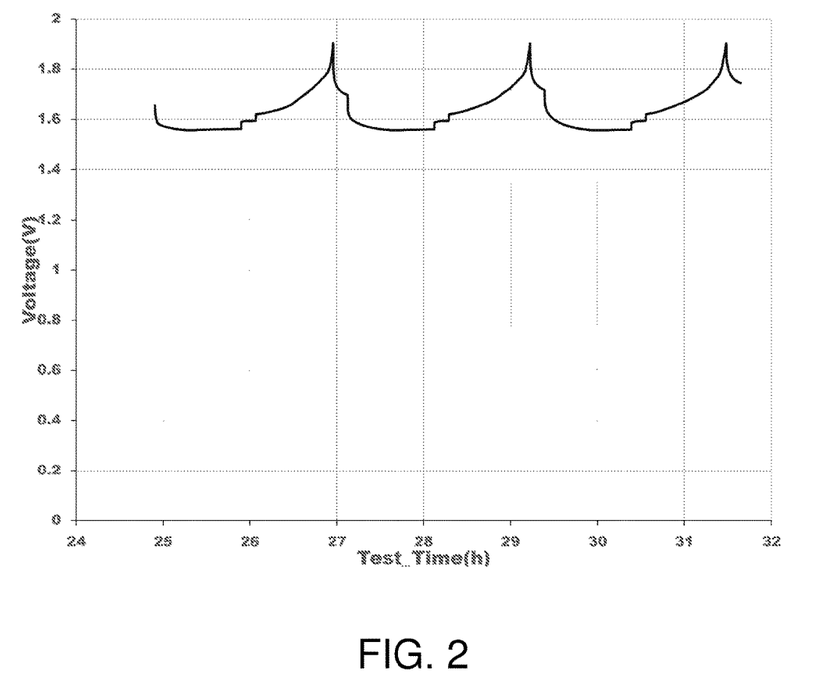
FIG. 2 is a graph of voltage vs. time (hours) for an exemplary battery of the disclosure over a number of discharge/charge cycles.

In a specific embodiment, a cell of the invention is prepared in the charged state as follows. A stainless steel can (cell housing) is lined with a piece of 5 cm×5 cm nickel foam on the inside and filled with enough $NaAlCl_4$ to cover the nickel foam. Sodium metal is cut into small pieces and 1.575 g is placed inside a one-end-closed β" alumina tube (5 mm i.d.). The one-closed end β" alumina tube is then placed into the stainless steel can and the cell is slowly heated to 270° C. at a rate of 50° C. every 30 min. Once the sodium metal becomes molten, a stainless steel current collector is inserted into the liquid sodium and a ceramic cap was positioned to seal the top of β" alumina tube. A ceramic washer with an outer diameter of 17 mm and an inner diameter of 8.5 mm was placed around the β" alumina tube and rested on top of the stain less steel can. A line of high temperature grease Krytox® XHT-BDZ (Trademark DuPont, Willington, Del.) was placed between the tube and the washer to fill any space there between. The initial OCV of the cell was 2.61 V at 270° C. Discharging of the cell results in the formation of an aluminum coating on the nickel foam. Galvanostatic cycling with potential limitation GCPL was performed by a Super Capacitor Test Station (SCTS, Arbin Instruments, College Station, Tex.) at a rate of 50 mA. A cycle consisted of discharging for 1 hour and charging to 1.9 V. FIG. 2 is a graph illustrating voltage change as a function of charge/discharge cycles for this cell.

Figure 3:
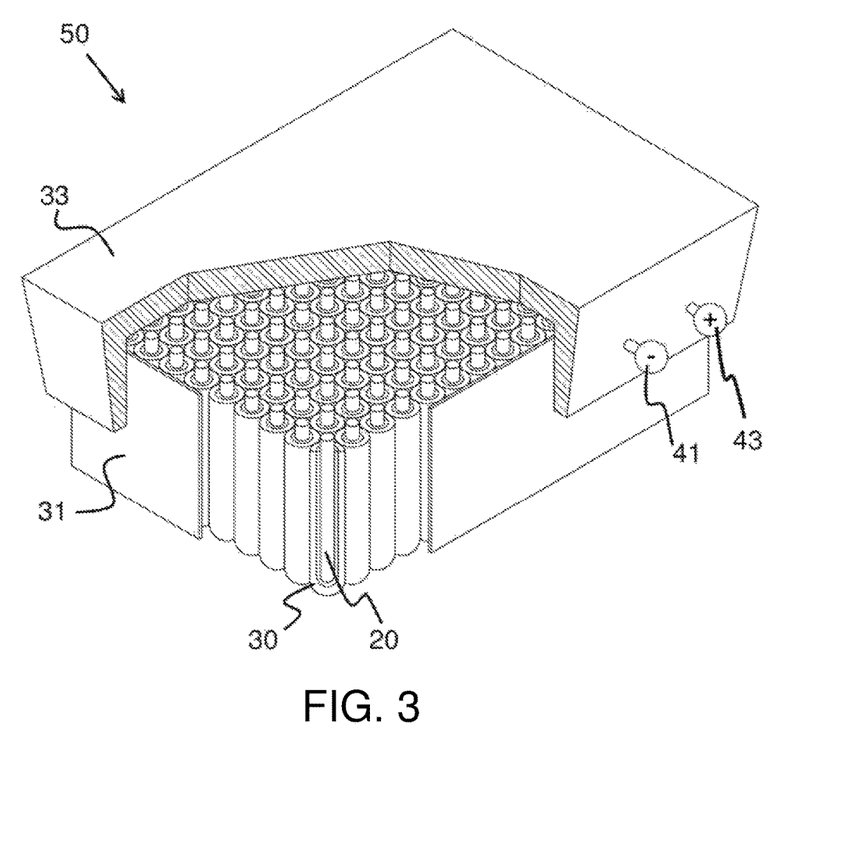
FIG. 3 is a schematic illustration of an exemplary multi-cell battery of this invention. The battery is exemplified with a plurality of tubular geometry cells as described in FIG. 1.

Batteries of the invention comprise one or more storage cells of the invention, electrically connected in series or in parallel as is known in the art. FIG. 3 provides a schematic illustration of an exemplary battery (50) of the invention. The battery is illustrated as comprising a plurality of cells of the invention (20). As is understood in the art dependent upon voltage and current requirements in a given application the cells may be electrically connected in series or in parallel. Electrical connection of the cells is not shown in FIG. 3. The illustrated battery is formed within a housing, which can be a two part housing with a base container (31) and a cover (33). Such a housing can be sealed employing any appropriate art-recognized method. Alternatively, the housing may be unitary. In the illustrated battery a chamber, channel or plurality of channels (not specifically shown) is/are formed within the battery housing allowing access of oxygen-containing gas into the chamber or channels. Note that cells may be selectively spaced to provide for additional channels for access of oxygen-containing gas. The housing may have a plurality of access points to allow the oxygen-containing gas to circulate in contact with the oxygen electrodes of the cells. In the illustrated battery, an air inlet (35) and an air outlet (37) are shown. Battery terminals (positive (43) and negative (41)) are provides through the battery housing. These terminals are electrically connected to the cells within the battery.

Supports (30) may be provides within the battery housing for one or more of the cells therein. Such supports optionally provide thermal insulation. The battery may be cooled or heated to maintain a desired operating temperature, for example, by contact with a cooling (or warming) liquid with the cells or the housing or by introducing one or more channels into and through the housing for carrying a cooling (or warming) liquid.

Structural components of the cells and batteries (e.g., cases, housings, caps, spacers, containers or receptacles) of the invention are made of materials compatible with the operating temperature of the cells and batteries and compatible with the compounds or compositions (e.g., liquid alkali metal, liquid electrolyte and positive electroactive materials) which they may contact, particularly at cell operating temperatures. Compatibility generally means that the components of the cells and batteries retain integrity and mechanical strength, as needed, in contact with cell compounds or compositions at cell operating temperatures, for example, the components do not detrimentally react with such compounds or compositions over a reasonable cell/battery lifetime. As is known in the art, the materials form which the components are made are preferably chosen to avoid undesired cracking or leakage, excessive corrosion, seal failure and/or undesired deposition on surfaces. For example, the cell housing can be mild steel or stainless steel, and spacers can be ceramic, such as boron nitride. Current collectors, including both positive and negative electrode current collectors, can be made of any appropriate conductive material as is known in the art. For example, current collectors can be made of Pt, Pd, Mo, Au, Ni, Ti, carbon, mild steel or stainless steel, among others. Current collectors can be in any shape, e.g., wires, ribbons, foils, brushes and the like.

Cells and batteries of this invention are useful in a variety of application and preferably are used for electric energy storage or electric vehicle propulsion.

Electrochemical performance of cells is assessed at least in part by determining the current and voltage efficiency as well as overall rates and cycle life. Cells are operated cathode limited to determine Faradaic utilization.

Performance of batteries can be assessed by determining one or more of the overall electrochemical energy conversion efficiency as a function of operating temperature; applied current density between 50 and 200 $mA/cm^2$ during charge/discharge; or the volumetric charge capacity that can be realized from the cathode ($mAh/cm^3$).

Additionally, cells can be subjected to extended charge/discharge cycling tests to identify evidence of degradation by cell components as a function of time. Again this assessment can be performed a nominal current densities over appropriately selected ranges (e.g., 50 to 200 $mA/cm^2$). Batteries of the invention preferably can be operated for at 100 charge/discharge cycles under constant current load without significant capacity fade.

When a group or range is disclosed or claimed herein, it is understood that all individual members of those groups or ranges and all combinations, all subgroups and all subranges are included and are intended to be disclosed separately. Each individual member of the group and all combinations and subcombinations possible of the group are individually included in the disclosure. Each individual group member recited can be used to practice the invention.

One of ordinary skill in the art will appreciate that device elements, device components, compositions, materials and methods other than those specifically exemplified can be employed in the practice of the invention without resort to undue experimentation. All art-known functional equivalents, of any such device elements, components, compositions, materials and methods are intended to be included in this invention.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains.

We claim:

1. A storage cell comprising:
   a negative electrode comprising liquid alkali metal;
   a positive electrode having a porous conductive substrate coated with aluminum when the cell is discharged;
   a liquid catholyte comprising sodium ions or aluminum ions during operation;
   a solid, alkali metal-conducting electrolyte separating the negative electrode and the liquid catholyte;
   wherein the liquid catholyte permeates the porous conductive substrate of the positive electrode, wherein the electroactive material of the positive electrode comprises aluminum; and wherein the porous conductive substrate is a porous nickel or nickel-coated metal substrate.

2. The storage cell of claim 1, wherein the catholyte is a liquid alkali metal haloaluminate.

3. The storage cell of claim 1, wherein the solid electrolyte is beta" (double prime) alumina.

4. The storage cell of claim 1, wherein the porous conductive substrate is a porous nickel substrate.

5. The storage cell of claim 1, wherein the liquid alkali metal is liquid sodium.

6. The storage cell of claim 5, wherein the liquid catholyte is a sodium haloaluminate.

7. The storage cell of claim 5, wherein the liquid catholyte is sodium chloroaluminate.

8. The storage cell of claim 5, wherein the liquid catholyte is an ionic liquid.

9. The storage cell of claim 1, wherein the liquid catholyte is an ionic liquid containing $AlCl_3$.

10. The storage cell of claim 1, wherein the alkali metal is sodium, the solid electrolyte is beta" alumina, the liquid catholyte is $NaAlCl_4$.

11. A battery comprising a plurality of cells of claim 1.

12. A method of storing electrical energy comprising forming one or more cell of claim 1 and charging the one or more cells by application of a voltage to the one or more cells to store electrical energy, wherein on charging the Al deposited on the positive electrode is substantially removed.

13. A method for generating energy comprising storing electrical energy by the method of claim 12 in one or more cell and discharging the one or more cell to generate electrical energy.

14. The method of claim 13 further comprising a step of storing electrical energy, wherein the one or more cells is rechargeable and wherein after discharging the one or more cells are recharged by application of a voltage to the cell, wherein the Al deposited on the positive electrode is substantially removed when the cell is recharged.

15. The method of claim 12, wherein the one or more cells are operated at a temperature between 150 to 300° C.

16. A method of storing electrical energy comprising forming one or more cell of claim 1 and charging the one or more cells by application of a voltage to the one or more cells to store electrical energy, wherein the alkali metal is sodium, the solid electrolyte is beta" alumina, the liquid catholyte is $NaAlCl_4$ and wherein the one or more cells are operated at a temperature between 225 and 275° C.

17. The method of claim 13, wherein the one or more cells are operated at a temperature between 150 to 300° C.

18. The method of claim 13, wherein the alkali metal is sodium, the solid electrolyte is beta" alumina, the liquid catholyte is $NaAlCl_4$ and wherein the one or more cells are operated at a temperature between 225 and 275° C.

19. The method of claim 1, wherein the electroactive material of the positive electrode consists of aluminum.

* * * * *